United States Patent [19]
Rea

[11] Patent Number: 5,967,554
[45] Date of Patent: Oct. 19, 1999

[54] TIRE TREAD CATCHER

[76] Inventor: Ryan M. Rea, 2019 Honey Suckle La., Jefferson City, Mo. 65109

[21] Appl. No.: 09/132,217

[22] Filed: Aug. 11, 1998

[51] Int. Cl.⁶ ..................................................... B62B 9/14
[52] U.S. Cl. ............................................................. 280/851
[58] Field of Search ................................... 280/851, 848, 280/847; 56/203, 205

[56] References Cited

U.S. PATENT DOCUMENTS

| | | | |
|---|---|---|---|
| Re. 24,339 | 1/1957 | La Pere . | |
| 1,506,684 | 1/1924 | Staples | 280/851 |
| 2,605,119 | 7/1952 | Earnest | 280/153 |
| 3,784,226 | 1/1974 | Vilfart et al. | 280/157 |
| 3,866,943 | 2/1975 | Innis | 280/851 |
| 4,124,221 | 11/1978 | Goings | 280/154 |
| 4,151,702 | 5/1979 | Brown | 56/203 |
| 4,190,939 | 3/1980 | Keller | 29/451 |
| 4,192,522 | 3/1980 | Morgan | 280/154 |
| 4,417,741 | 11/1983 | Ciocan | 280/154 |
| 4,436,319 | 3/1984 | Clutter | 280/154 |
| 4,655,468 | 4/1987 | Cunningham | 280/851 |
| 5,058,827 | 10/1991 | Dansereau et al. | 244/103 |
| 5,460,411 | 10/1995 | Becker | 280/851 |
| 5,462,324 | 10/1995 | Bowen et al. | 293/15 |

*Primary Examiner*—Lanna Mai
*Assistant Examiner*—Faye M. Fleming
*Attorney, Agent, or Firm*—Richard J. Grundstrom

[57] ABSTRACT

A tire tread catcher consisting of canister that catches tread as they are thrown off tire(s) and a housing surrounding the tire(s) to funnel and direct tread and road debris to the canister. The canister is attached to a truck or trailer undercarriage adjacent to and right behind the tires. The canister is open towards the tire and may have a scope shaped bottom edge. The housing encloses the front and sides of the tire. The front plate of the housing can be tapered to reduce wind resistance. The side plates also reduces wind resistance and protects the tire(s) from sun exposure. The housing helps to ensure any tread thrown off the tire is directed towards the canister, where the tread and debris is captured and retained.

14 Claims, 5 Drawing Sheets

TIRE TREAD CATCHER

BACKGROUND OF THE INVENTION

The present invention relates to a tire tread catcher and more particularly to an apparatus that attaches to the undercarriage of a vehicle or trailer around and behind the tire(s) to catch any tread thrown from a tire.

Retreaded tires are often used on trucks, trailers, cargo vans and other type of vehicles. The retreaded tires are typically cheaper than new tires, making them attractive to the users. One problem with retreaded tires is that they often throw the tread off the tire. The tread thrown off typically lands on the highway and creates a road hazard. The tread laying on the highway can cause damage to automobiles and other vehicles. The tread can also cause a driver to maneuver around the obstacle. This can cause traffic problems and perhaps a collision with another vehicle or an accident of some other sort.

The tire tread catcher of this invention addresses this problem. The thrown tread is captured and retained for later disposal and eliminates the hazards created by tread left behind on the highway.

Tires and the materials tires are made of are now recyclable. As such, tread left behind usually ends up being trashed. However, with the tread catcher of this design, the tread is retained for proper disposal and recycling.

Another benefit of the tread catcher of this invention is that other road hazards are also reduced. Other objects, such as rocks and other debris, are often thrown by rotating tires of vehicles. The tire tread catcher of this invention also captures and retains flying debris to reduce these types of road hazards.

Accordingly, it is an object of the present invention to provide a tire tread catcher adapted to capture and retain tread thrown from retreaded tires.

Another object of the present invention is to provide a tire tread catcher constructed to reduce or eliminate road hazards due to tread being left behind on the highway and the collection and retention of other debris that may be a road hazard.

A further object of the present invention is to provide a tire tread catcher adapted to protect the tire or tires on a vehicle from deterioration from the sun, thereby extending the life of the tires.

Still another object of the present invention is to provide a tire tread catcher that may reduce wind resistance thereby improving the performance of the vehicle.

Still a further object of the present invention is to provide a tire tread catcher adapted to funnel and direct tread thrown from the tire or tires and road debris into a canister for retention and later disposal. The tire tread catcher of this invention is characterized by a housing surrounding the tire(s) to act as a funnel to direct objects to a canister mounted behind the tire(s).

These and other objects and features of the present invention will be better understood and appreciated from the following detailed description of the main embodiment thereof, selected for purposes of illustration and shown in the accompanying drawings.

SUMMARY OF THE INVENTION

To accomplish the foregoing and other objects of this invention there is provided a tire tread catcher and more particularly a tread catcher that catches treads from recapped or retreaded tires thrown off trucks and other vehicles while traveling highways.

The tire tread catcher of this invention includes a canister that catches tread, and other debris, as they are thrown off tires. The canister is attached to a truck or trailer undercarriage adjacent to and right behind the tires. The canister is open toward the tire and may have a scope shaped bottom edge. A housing is provided that encloses the front and sides of the tire. The front plate of the housing can be tapered or contoured to reduce wind resistance. The side plates also reduce wind resistance and protects the tire(s) from sun exposure. The housing helps to ensure any tread thrown off the tire(s) is directed toward or funneled toward the canister. The canister captures and retains the thrown tread, rather than leaving it behind on the highway and creating a road hazard.

DETAILED DESCRIPTION

Figure 1:
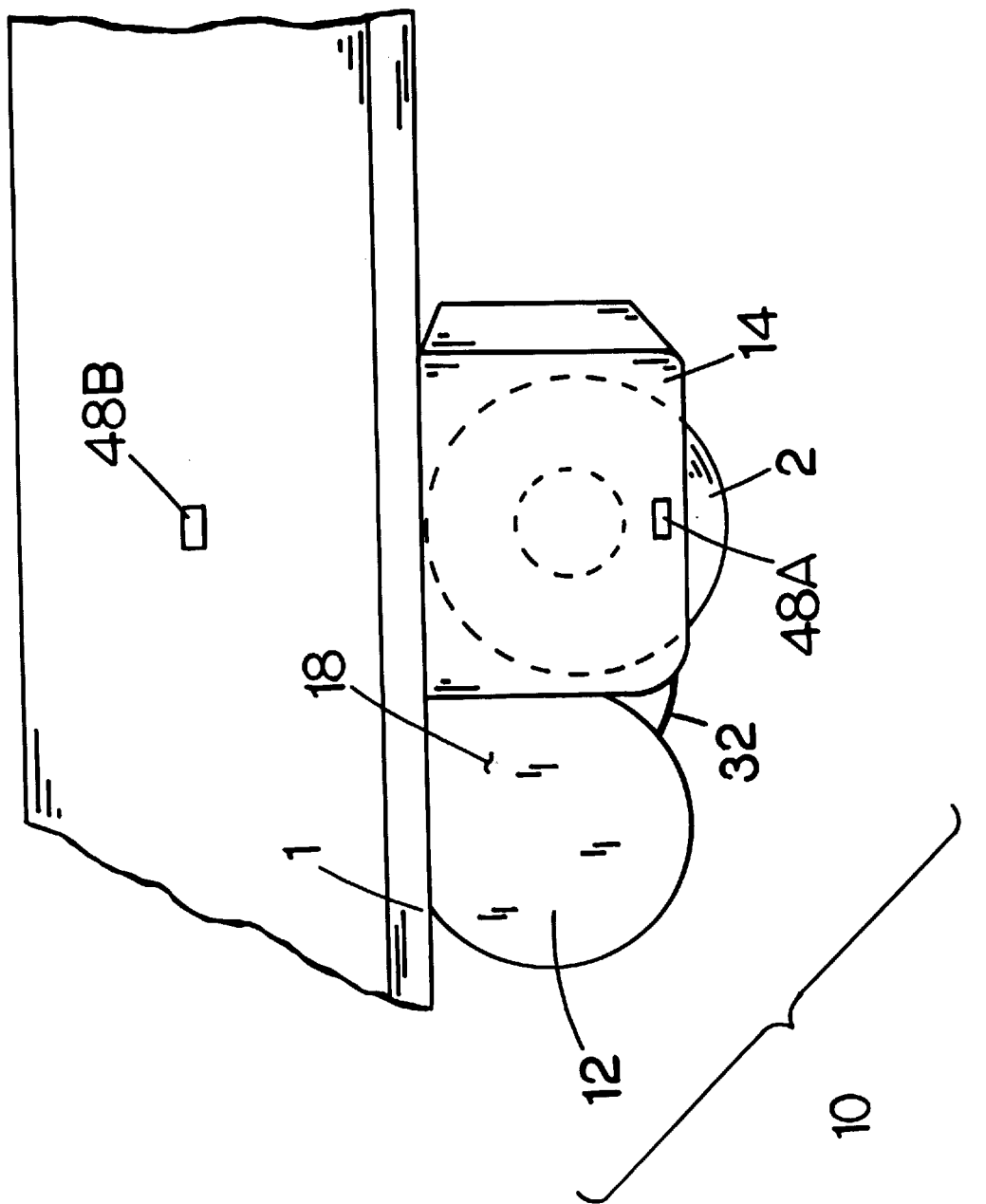
FIG. 1 is a side view of the tire tread catcher of this invention.
Figure 2:
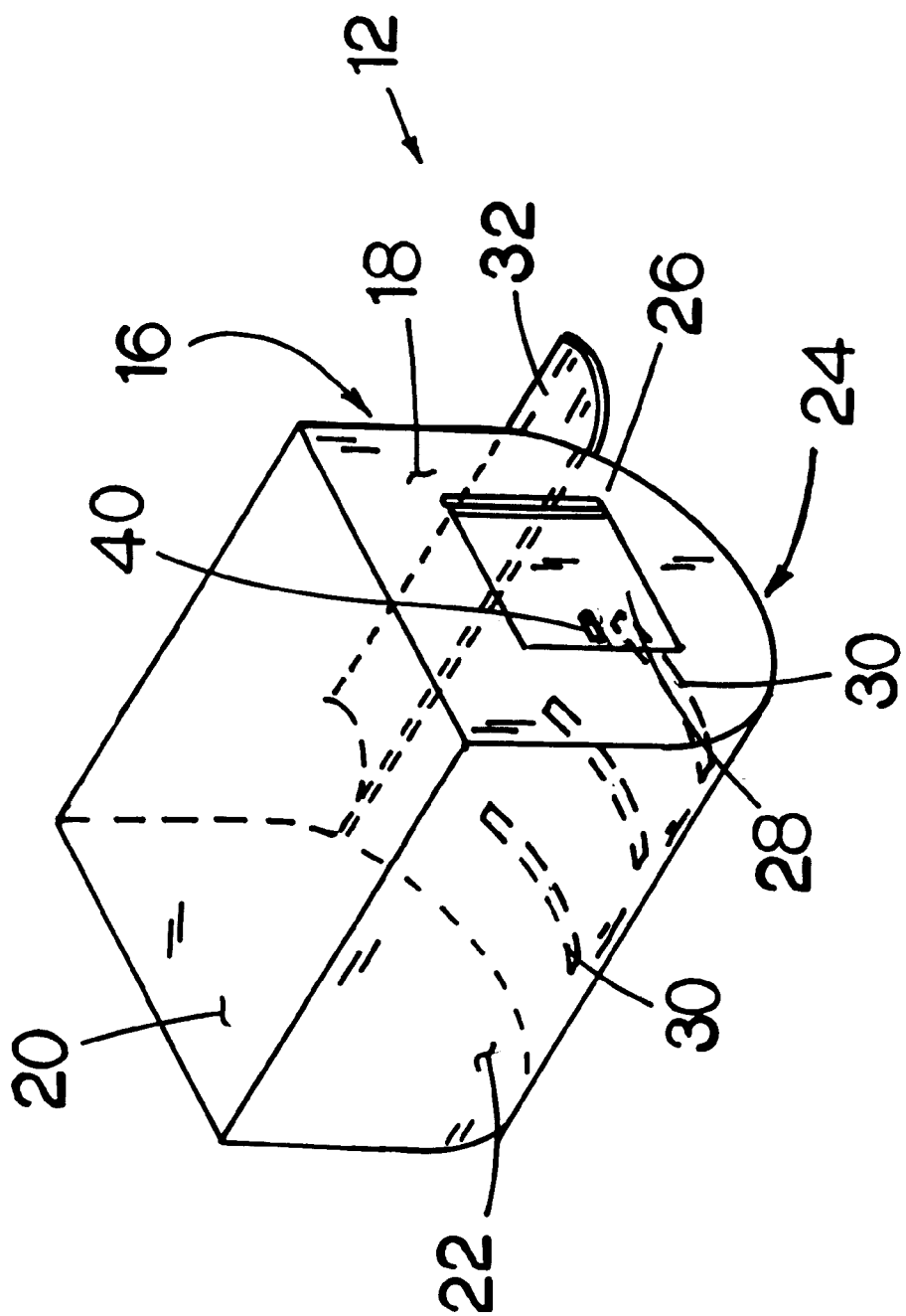
FIG. 2 is an isometric of the canister for the tire tread catcher.

Referring now to the drawings there is shown the preferred embodiment for the tire tread catcher 10 of this invention.

The tire tread catcher 10 of this invention basically consists of a canister 12 that catches tread as they are thrown off tires and road debris. The canister 12 is attached to a truck or trailer undercarriage 1 adjacent to and right behind the tire or tires 2. The canister 12 is open towards the tire with an optional scope 32 with a scooped shaped bottom edge. A housing 14 is provided that encloses the front and sides of the tire or tires 2. The front plate 34 can be tapered to reduce wind resistance. An outer side plate 36 also reduces wind resistance and protects the tire(s) 2 from sun exposure. The housing 14 helps to ensure any tread thrown off the tire or road debris is captured and retained by the canister.

The preferred embodiment and the best mode contemplated of the tire tread catcher 10 of the present invention are herein described. However, it should be understood that the best mode for carrying out the invention hereinafter described is offered by way of illustration and not by the way of limitation. It is intended that the scope of the invention includes all modifications which incorporate its principal design features.

The tire tread catcher 10 of this invention has two main and basic parts. These are canister 12 and housing 14. Both are made with several different components. The canister 12 is mounted directly behind the tire or tires 2 on the frame of undercarriage 1 of a vehicle or trailer. Typically, the tire tread catcher 10 is used on tractor-trailers and which use retreaded tires. But, it can be used on any vehicle having a potential to throw off thread. Retreaded tires are often used because of the cost of new tires. It is also common that retreaded tires throw tread from the tires and create hazards on the highways. The canister 12 of this invention captures and retains the thrown tread. The canister 12 also captures and retains other objects that become road hazards, such as rocks and debris that become air borne by rotating tires on a vehicle. As such, the tire tread catcher provides additional safety features.

The housing 14 is mounted in a manner that surrounds the tire or tires directly in front of the canister 12. The front and sides of the tire(s) are enclosed. The housing 14 has a number of different functions. First, the housing 14 funnels or directs any thrown tread or other objects picked up by the tire or tires toward the canister 12. Second, the housing 14 reduces wind resistance. Third the housing 14 protects the tire or tires from sun exposure which causes tire deterioration.

The canister 12 is typically mounted to an undercarriage or frame 1 of a vehicle or trailer. The canister 12 would be installed directly behind the tire or tires. The canister 12, in the preferred embodiment, has an open front face 16 that faces the tire or tires, two side plates 18 and 20 which are parallel to the tires and forms the outer sides of the canister 12, a back panel 22 that encloses the back and a bottom plate 24 that encloses the bottom. A top panel may or may not be used. If used, it would enclose the top portion of the canister 12. The panels or plates will typically be made of sheet metal, in the preferred embodiment, but sheet aluminum or perhaps fiberglass or plastic in some instances could also be used. The specific material would be determined by the manufacturing process desired, cost, availability of material, the application and desires of the manufacture and users. The specific material would have to be sufficiently strong to absorb the impact of flying debris and thrown tread and retain them within the canister 12.

The canister 12, in the preferred embodiment, would also have an emptying means 26. The emptying means 26 provides a means of emptying the contents of the canister 12. The emptying means 26 could be made in a number of different way. The emptying means 26 is generally a pivoting member that opens and closes to allow access into the canister. The emptying means 26 could be a separate door 28 on any of the panels or plates. A door 28 is illustrated on side panel 18, but it could be on any panel or plate. The emptying means 26 could also be made by pivotally attaching the back panel 22, bottom plate 24 or side panel 18 to the canister such that the panel or plat opens so contents within the canister can be removed. In the preferred embodiment, the bottom plate 24 is hinged, by hinge 38, at the front edge so the rear drops down and opens the canister 12. In this manner, the contents are easily dumped and removed. Of course, a latch 40 would be used to secure the emptying means 26 in a closed position.

Also in the preferred embodiment, the bottom plate 24 has one or more openings 30 for draining water, dust and small debris. The opening(s) 30 will typically be located at the lowest portion of the canister 12, as shown, to allow natural flow of water out of the canister 12. Opening(s) 30 could also be included at the area of greatest impact of water to expediently remove water as it impacts the inside of canister 12.

A scoop 32 to assist in directing thrown tread and debris into the canister can be included. The scoop 32 is laterally attached to a bottom edge of the open front face 16 on the canister 12 and extends forward toward the tire or tires 2. The scoop 32 would have a curved or scooped shaped surface and bottom end to help direct items into the canister 12.

A housing 14 is attached to an undercarriage or frame 1 of a vehicle or trailer directly in front of the canister 12 and surrounding the tire or tires 2. The housing 14 generally consists of a front plate 34 forward of the tires, an inside side panel 42, an outside side panel 36 pivotally attached at the top edge by hinge 44, and an open back face 46. The open back face 46 abuts and joins the open front face 18 on the canister 12.

Figure 3:
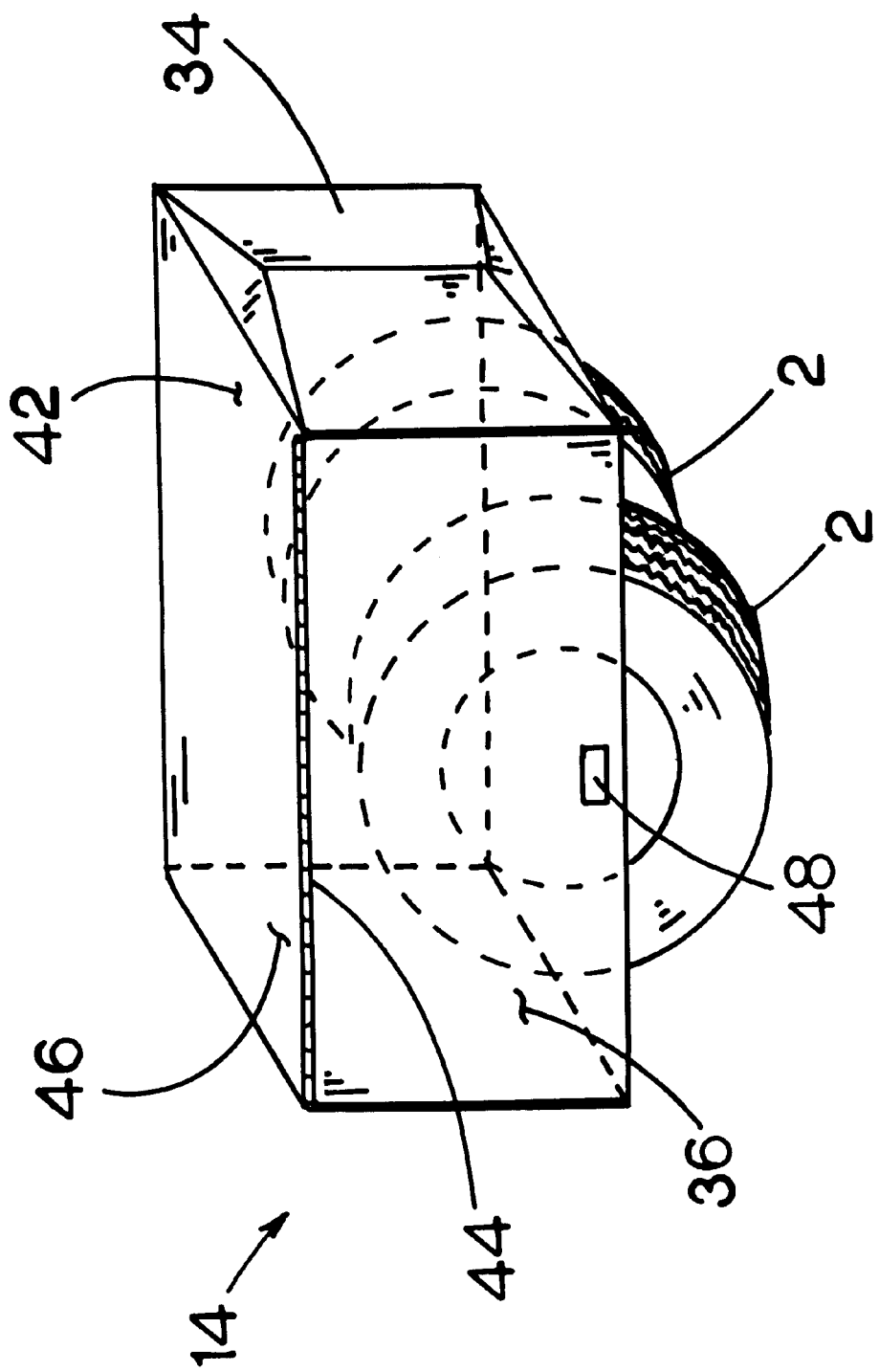
FIG. 3 is an isometric of the housing for the tire tread catcher.

The front plate 34 on the housing can also be contoured or tapered outward, as illustrated on FIG. 1 and 3, to reduce wind resistance.

A door latch 48 is used to hold the outer side panel 36 in an upward position so access to the tires is not obstructed during maintenance and tire inspection. The latch 48 consist of a first member 48A attached to an outside surface of the outer side panel 36 on the housing 14 and a second member 48B located on the side of the vehicle or trailer. The latch members 48A and 48B cooperate with each other to securely hold the outer side panel 36 when it is pivoted outward and upwards. The latch 48 catches and holds the outer side panel 36 in an upright position.

The housing 14 surrounds one or more tires 2 such that any tread thrown off the tires 2 will be directed or funnel through the open back face 46 and into the open front face 16 of the canister 12. The canister 12 captures and retains the thrown tread.

Figure 4:
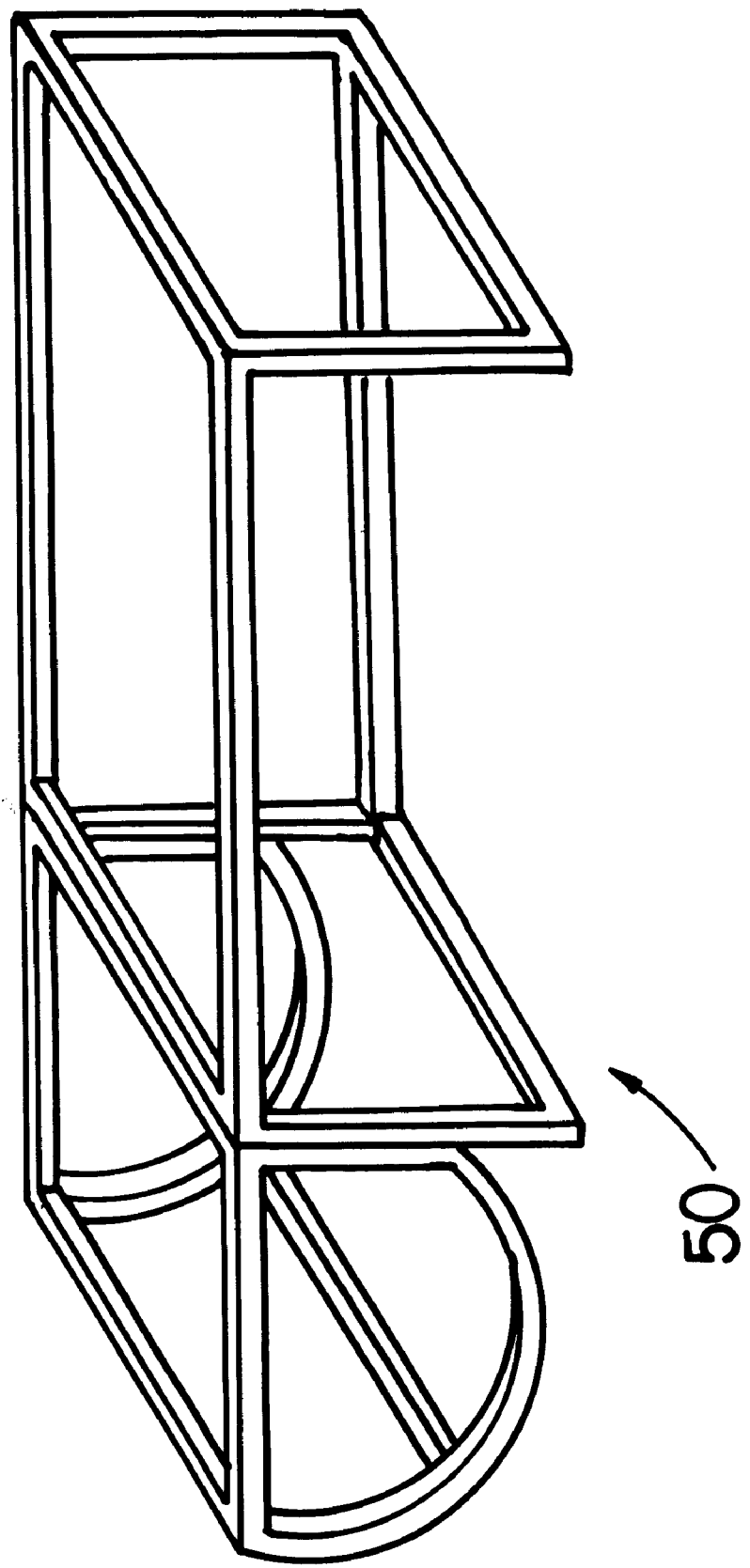
FIG. 4 is an isometric of an example of a frame structure for the tire tread catcher.
Figure 5:
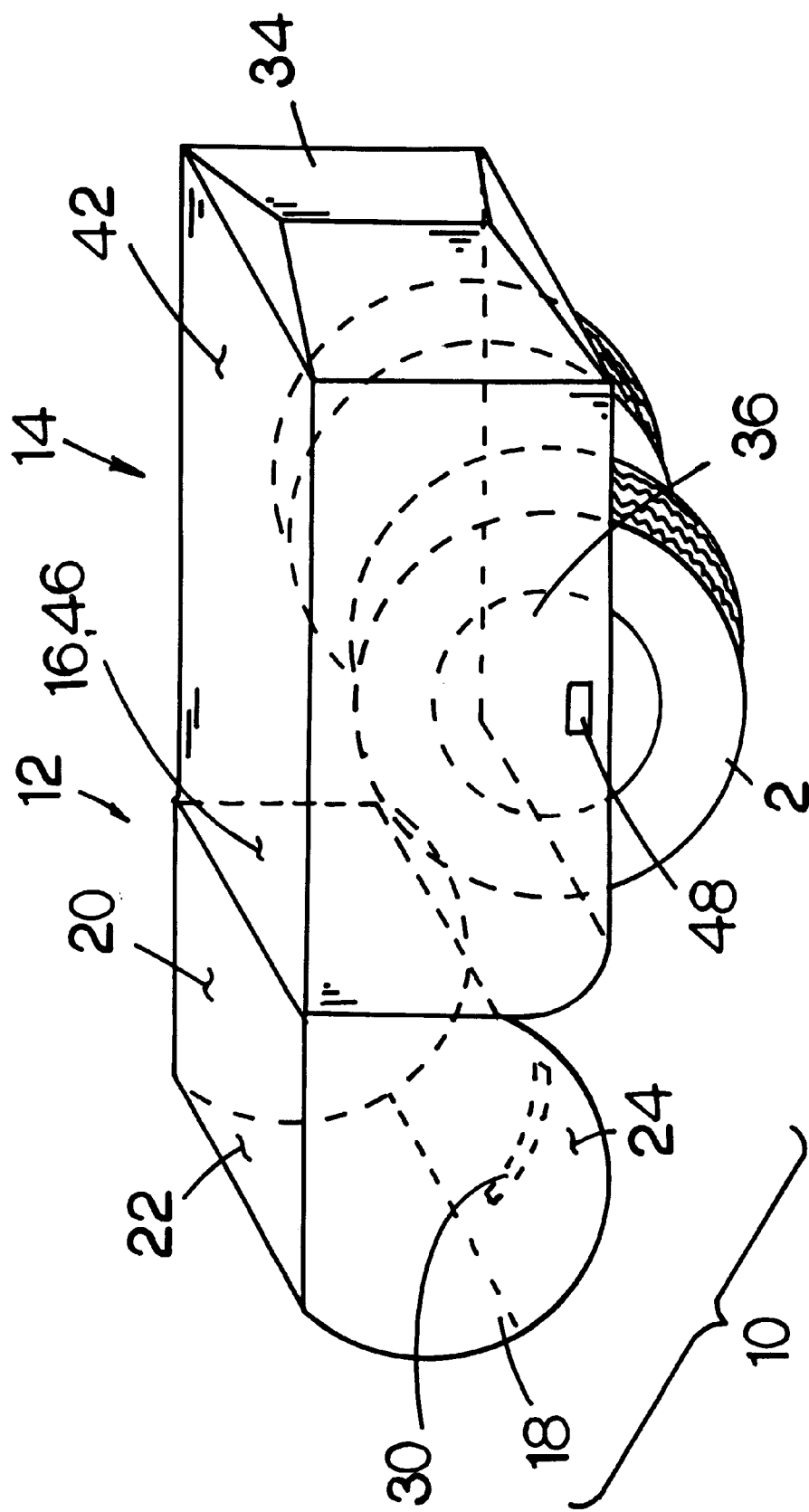
FIG. 5 is an isometric of the tire tread catcher.

The tire tread catcher 10 may also include a frame structure 50. FIG. 4 The frame structure 50 is attached to the undercarriage or frame 1 of the vehicle or trailer. The various panel and plates forming the canister 12 and housing 14 are attached to the frame structure 50. The frame structure is not necessary if the panels and plates have sufficient strength, in themselves. However, is this sheet metal, aluminum or plastic is used, the frame structure 50 is provided. The frame structure 50 maintains the tire tread catcher 10 shape and gives it strength. As illustrated, the frame structure is built using a plurality of members made from steel channel or steel tube. All the various members are cut to size and shaped as needed to form the frame structure 50. The frame structure 50 can be built from the material best suited for the purpose without departing from the scope and spirit of the inventive concept. In order to leave access to the tire(s) 2 a portion of the frame structure 50 corresponding to the lower portion of the outer side panel 36 of housing 14 should be left off. Otherwise, it would interfere with tire access.

Having described the invention in detail, those skilled in the art will appreciate that modifications may be made of the invention without departing from the spirit of the inventive concept herein described.

Therefore, it is not intended that the scope of the invention be limited to the specific and preferred embodiments illustrated and described. Rather, it is intended that the scope of the invention be determined by the appended claims and their equivalents.

What is claimed is:

1. A tire tread catcher comprising:
 a canister mounted to an undercarriage or frame of a vehicle or trailer behind one or more tires, the canister comprising:
  an open front face,
  two side plates,
  a back panel and
  a bottom plate, and
 an emptying means, providing a means of emptying the contents of the canister, and
 a housing attached to an undercarriage or frame of a vehicle or trailer in front of the canister, the housing comprising:
  a front plate forward of the tires,
  an inside side panel,
  an outside side panel pivotally attached to the housing at the top edge, and
  an open back face, the open back face abutting the open front face of the canister, the housing surrounding one or more tires such that any tread thrown off the tires or road debris picked up by the tire(s) will be directed or funneled through the open back face of the housing and into the open front face of the canister so the canister can capture and retain the thrown tread or road debris.

2. The tire tread catcher as set forth in claim 1 further comprising one or more openings in the bottom plate on the canister for draining water, dust and small debris.

3. The tire tread catcher as set forth in claim 1 further comprising a scoop, the scoop laterally attached to a bottom edge of the open front face on the canister and extending forward towards the tire or tires to assist in scooping and capturing thrown tread and road debris.

4. The tire tread catcher as set forth in claim 1 in which the front plate on the housing is contoured to reduce wind resistance.

5. The tire tread catcher as set forth in claim 1 further comprising a frame structure, the frame structure being attached to the undercarriage or frame of the vehicle or trailer and the canister and the housing attached to and built on the frame.

6. The tire tread catcher as set forth in claim 5 in which the frame consists of a plurality of members joined to form the basic shape of the canister and the basic shape of the housing.

7. The tire tread catcher as set forth in claim 1 further comprising a latch, the latch consisting of a first member attached to an outside surface of the outside panel on the housing and a second member located on the side of the vehicle or trailer, such that as the outside panel is pivoted outward and upwards, the latch catches and holds the outside panel in an upright position to give access to the tire or tires.

8. The tire tread catcher as set forth in claim 1 in which the emptying means comprises a pivotally attached member, the pivotally attached member being a separate door on the canister or pivotally attaching the back panel, bottom plate or side panel on the canister such that contents within the canister can be removed.

9. A tire tread catcher comprising:

a canister mounted to an undercarriage or frame of a vehicle or trailer behind one or more tires, the canister comprising: an open front face, two side plates, a back panel and a bottom plate;

an emptying means, providing a means of emptying the contents of the canister, the emptying means comprises a pivotally attached member, the pivotally attached member being a separate door on the canister or pivotally attaching the back panel, bottom plate or side panel on the canister such that contents within the canister can be removed;

one or more openings in the bottom plate on the canister for draining water, dust and small debris; and a housing attached to an undercarriage or frame of a vehicle or trailer in front of the canister, the housing comprising: a front plate forward of the tires, an inside side panel, an outside side panel pivotally attached to the housing at the top edge, and an open back face, the open back face abutting the open front face of the canister;

the housing surrounding one or more tires such that any tread thrown off the tires or road debris picked up by the tire(s) will be directed or funneled through the open back face of the housing and into the open front face of the canister so the canister can capture and retain the thrown tread or road debris.

10. The tire tread catcher as set forth in claim 9 further comprising a scoop, the scoop laterally attached to a bottom edge of the open front face on the canister and extending forward towards the tire or tires to assist in scooping and capturing thrown tread and road debris.

11. The tire tread catcher as set forth in claim 9 in which the front plate on the housing is contoured to reduce wind resistance.

12. The tire tread catcher as set forth in claim 1 further comprising a frame structure, the frame structure being attached to the undercarriage or frame of the vehicle or trailer and the canister and the housing attached to and built on the frame.

13. The tire tread catcher as set forth in claim 9 further comprising a latch, the latch consisting of a first member attached to an outside surface of the outside panel on the housing and a second member located on the side of the vehicle or trailer, such that as the outside panel is pivoted outward and upwards, the latch catches and holds the outside panel in an upright position to give access to the tire or tires.

14. A tire tread catcher comprising:

a canister mounted to an undercarriage or frame of a vehicle or trailer behind one or more tires, the canister comprising: an open front face, two side plates, a back panel and a bottom plate;

an emptying means, providing a means of emptying the contents of the canister, the emptying means comprises a pivotally attached member, the pivotally attached member being a separate door on the canister or pivotally attaching the back panel, bottom plate or side panel on the canister such that contents within the canister can be removed;

one or more openings in the bottom plate on the canister for draining water, dust and small debris;

a scoop, the scoop laterally attached to a bottom edge of the open front face on the canister and extending forward towards the tire or tires to assist in scooping and capturing thrown tread and road debris;

a housing attached to an undercarriage or frame of a vehicle or trailer in front of the canister, the housing comprising: a front plate forward of the tires, an inside side panel, an outside side panel pivotally attached to the housing at the ton edge, and an open back face, the open back face abutting the open front face of the canister; the front plate on the housing being contoured to reduce wind resistance;

a latch, the latch consisting of a first member attached to an outside surface of the outside panel on the housing and a second member located on the side of the vehicle or trailer, such that as the outside panel is pivoted outward and upwards, the latch catches and holds the outside panel in an upright position to give access to the tire or tires; and a frame structure, the frame structure being attached to the undercarriage or frame of the vehicle or trailer and the canister and the housing attached to and built on the frame;

the housing surrounding one or more tires such that any tread thrown off the tires or road debris picked up by the tire(s) will be directed or funneled through the open back face of the housing and into the open front face of the canister so the canister can capture and retain the thrown tread or road debris.

\* \* \* \* \*